US006982122B2

(12) United States Patent
Liu et al.

(10) Patent No.: US 6,982,122 B2
(45) Date of Patent: Jan. 3, 2006

(54) IR-BASED ALLOYS FOR ULTRA-HIGH TEMPERATURE APPLICATIONS

(75) Inventors: Chain T. Liu, Oak Ridge, TN (US); Easo P. George, Knoxville, TN (US); Everett E. Bloom, Kingston, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 45 days.

(21) Appl. No.: 10/737,649

(22) Filed: Dec. 15, 2003

(65) Prior Publication Data

US 2005/0129960 A1 Jun. 16, 2005

(51) Int. Cl.
*B32B 15/00* (2006.01)
*C22C 28/00* (2006.01)
*C22C 5/00* (2006.01)

(52) U.S. Cl. ..................... 428/670; 420/461
(58) Field of Classification Search ................ 428/670; 420/461
See application file for complete search history.

(56) References Cited

U.S. PATENT DOCUMENTS

| | | | | |
|---|---|---|---|---|
| 3,293,031 A | * | 12/1966 | Rhys et al. ................. | 420/461 |
| 3,466,158 A | * | 9/1969 | Rhys .......................... | 428/670 |
| 3,918,965 A | | 11/1975 | Inouye et al. | |
| 3,970,450 A | | 7/1976 | Liu et al. | |
| 4,253,872 A | | 3/1981 | Liu et al. | |
| 4,705,610 A | * | 11/1987 | Tenhover et al. ........... | 205/474 |
| 5,287,237 A | * | 2/1994 | Kitada et al. .......... | 360/327.32 |
| 5,853,904 A | * | 12/1998 | Hall et al. ................... | 428/670 |
| 6,511,632 B1 | * | 1/2003 | Choi et al. .................. | 420/461 |
| 2003/0136478 A1 | * | 7/2003 | Mitarai et al. .............. | 148/426 |
| 2004/0263041 A1 | * | 12/2004 | Tinwell et al. .............. | 313/141 |

FOREIGN PATENT DOCUMENTS

JP 2002-285260 * 10/2002

OTHER PUBLICATIONS

Derwent Abstract for SU 461463A, published Apr. 11, 1975, one page.*
H. Hosoda et al, "Phase Stability & Mechanical Properties of IrAl Alloys" Matls. Trans, JIM 38, 871-879, 1997.
X. Yu et al, "High Temp. Materials Based on Quaternary Ir-Nb-Ni-Al Alloys" Mat.Res.Soc. Symp.Proc., V. 646, pp. N3.7.1-3.7.6, 2001.
Y. Yamabe-Mitarai,"High Temp. Strength of Ir-Based Refractory Super-alloys," MRS Symp. Proc., V. 646, pp. N3.6.1-3.6.12, 2001.

* cited by examiner

*Primary Examiner*—John J. Zimmerman
(74) *Attorney, Agent, or Firm*—Joseph A. Marasco

(57) ABSTRACT

An alloy composition includes, in atomic percent: about 1 to about 10% of at least one element selected from the group consisting of Zr and Hf, balance Ir.

5 Claims, 5 Drawing Sheets

IR-BASED ALLOYS FOR ULTRA-HIGH TEMPERATURE APPLICATIONS

The United States Government has rights in this invention pursuant to contract no. DE-AC05-00OR22725 between the United States Department of Energy and UT-Battelle, LLC.

FIELD OF THE INVENTION

The present invention relates to Ir-based metallic alloys, and more particularly to Ir-based metallic alloys having superior strength for ultra-high temperature (>1200° C.) applications.

BACKGROUND OF THE INVENTION

High temperature materials have been used extensively in advanced heat engines and energy conversion systems as well as in many industrial engineering systems. High-temperature alloys are needed to improve thermal efficiency through increased operating temperature of heat engines and energy conversion devices. The operative temperature of advanced energy conversion systems is currently limited by structural materials which lose their strength and/or oxidation resistance at high temperatures. Ni-based superalloys can be used at temperatures up to 950° C. in polycrystalline forms and at temperatures approaching 1100° C. in single crystalline forms. Structural ceramics, on the other hand, possess adequate strength at higher temperatures, but their poor fracture toughness and environmental sensitivity greatly restrict their use as engineering materials. There is therefore a need for metallic alloys that can be used as structural materials at temperatures above 1200° C. in oxidizing environments.

For example, nozzle materials for hypersonic wind tunnel use are required to withstand exposure to high-pressure oxidizing gases at temperatures up to 1500° C. Because of the high-temperature requirement, only ceramic materials and refractory metal alloys have been considered for such applications. Ceramic materials have good strength at high temperatures but poor fracture toughness and limited thermal shock resistance at ambient temperatures. Refractory metal alloys, such as Nb and Ta-based alloys, on the other hand, have high melting points and good toughness, but poor oxidation resistance at elevated temperatures. Refractory noble-metal alloys based on Ir are of interest for high temperature use because of their high melting point (~2440° C.) and good oxidation resistance in air. However, currently existing Ir-based alloys are limited by reduced strength at temperatures above 1200° C. There is a need for Ir-based alloys that retain strength at temperatures above 1200° C.

OBJECTS OF THE INVENTION

Accordingly, objects of the present invention include the provision of new metallic alloys that can be used as structural materials at temperatures above 1200° C. in oxidizing environments, and in particular, Ir-based alloys that retain superior strength at temperatures above 1200° C. Further and other objects of the present invention will become apparent from the description contained herein.

SUMMARY OF THE INVENTION

In accordance with one aspect of the present invention, the foregoing and other objects are achieved by an alloy composition which includes, in atomic percent: about 1 to about 10% of at least one element selected from the group consisting of Zr and Hf, balance Ir.

In accordance with another aspect of the present invention, an article includes a substrate having thereon an alloy coating that includes, in atomic percent, about 1 to about 10% of at least one element selected from the group consisting of Zr and Hf, balance Ir.

For a better understanding of the present invention, together with other and further objects, advantages and capabilities thereof, reference is made to the following disclosure and appended claims in connection with the above-described drawings.

DETAILED DESCRIPTION OF THE INVENTION

New Ir-based alloys containing Zr/Hf, W and other minor alloying additions can be readily fabricated by conventional melting and casting techniques. The Ir alloys in accordance with the present invention are ductile at ambient temperatures and extremely strong at elevated temperatures. Compression tests show that the alloys exhibit yield strengths of 740 MPa and an ultimate strength of 1120 MPa at 1477° C. The alloys are found to be even stronger than structural ceramics, including aluminide oxide and silicon carbide and nitride at temperatures above 1400° C. It is contemplated that the Ir alloys of the present invention are substantially stronger than all other known metallic alloys at high temperatures. In addition, the Ir alloys possess excellent thermal shock resistance and oxidation resistance measured at 1427° C., likely above 1500° C. and as high as 1600° C.

An Ir-based alloy, Ir-0.3W doped with about 60 wppm (0.006 wt. %) Th, was selected as the base composition for initial alloy development. This alloy has good ductility at ambient temperatures but limited strength at elevated temperatures. For example, this alloy has a yield strength of only 52 MPa at 1370° C.

Nb Effects

Figure 1:
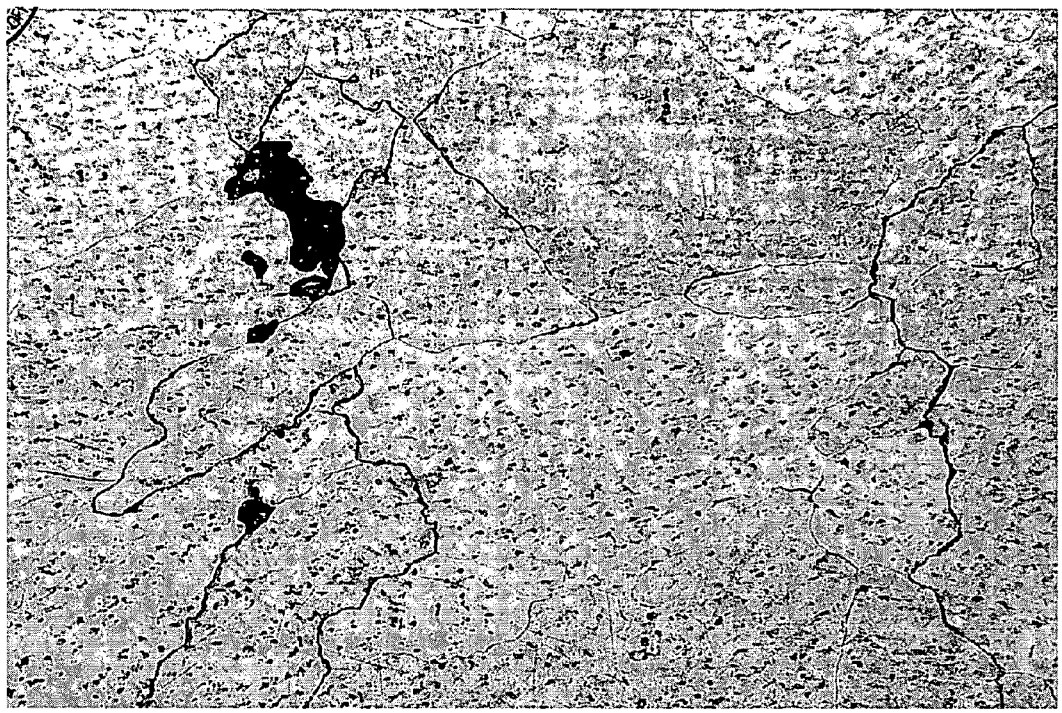
FIG. 1 is an optical micrograph showing microcracks in IRHT-5 alloy annealed for 1 h at 1500° C.

Alloy additions of Nb, some with and some without additional Zr, were made to the base composition. Table 1 summarizes the nominal compositions of these alloys, designated as IRHT-1 to IRHT-6, prepared by arc melting and drop casting into a Cu mold. The alloys were successfully prepared without difficulty. The hardness of these IRHT alloys was determined in both the as-cast condition and an annealed condition (1 h at 1500° C. in vacuum). The measured hardness data are also listed in Table 1. Nb additions are very effective in hardening the Ir based alloy, with the hardness increasing from 280 to 928 DPH at 10% Nb. Metallographic examination shows a two-phase structure in the Nb containing alloys. However, the Nb additions apparently cause microcracking along grain boundaries, as seen in FIG. 1. Microalloying additions of carbon and boron were included in some of the Nb-containing alloys (e.g., IRHT-6) for refining grain size in as-cast ingots. These elements were found to reduce the microcracking tendency somewhat but did not completely eliminate it.

hardener in the Ir based alloys. The composition of second-phase particles observed in IRHT-12 was analyzed using an electron microprobe. The particles contain roughly 18.5 at % Hf (possibly $Ir_3Hf$ phase), with the balance being Ir.

Mechanical Properties

Mechanical properties of IRHT alloys were determined by compression testing at room temperature and 1427° C. (1700 K). Rod specimens with dimensions of 2.5 mm diameter×5 mm length were prepared by electro-discharge machining (EDM), followed by annealing for 1 h at 1500° C. Room-temperature tests were conducted on a MTS testing machine with a 50,000 lb load cell, and elevated-temperature tests were performed on an Instron testing machine with a 1,000 lb load cell. The test results obtained at a strain rate of $2\times10^{-2}$ per second are listed in Table 2. The mechanical properties of a Co-based high-temperature com-

TABLE 1

| Alloy Number | Alloying Additions (at. %)[a] | As-Cast Hardness (DPH) | Heat-Treated[b] Hardness (DPH) |
| --- | --- | --- | --- |
| IRHT-1 | 16.5Nb-0.3W | 816 | |
| IRHT-2 | 16.5Nb-0.7Zr-0.3W | 836 | |
| IRHT-3 | 14.0Nb-0.2Zr-o.3W | 905 | |
| IRHT-4 | 12.0Nb-0.6Zr-0.3W | 815 | 927 |
| IRHT-5 | 10.0Nb-0.5Zr-0.3W | 912 | 928 |
| IRHT-6 | 8.0Nb-0.1Zr-0.3W-0.46C-0.06B | 561 | 592 |
| IRHT-7 | 10.0Ta-0.3W-0.46C | 799 | |
| IRHT-8 | 0.7Zr-0.3W | 318 | |
| IRHT-9 | 4.0Zr-0.3W-0.31C | 541 | 529 |
| IRHT-10 | 4.5Zr-0.3W-0.31C | | 580 |
| IRHT-11 | 5.0Zr-0.3W-0.46C | 744 | 566 |
| IRHT-12 | 5.0Hf-0.3W-0.31C | 615 | 620 |

[a] All alloys were doped with 0.005 at. % (0.006 wt. %) Th
[b] Annealed for 1 h at 1500° C. in vacuum.

Ta Effects

Although Nb is effective in hardening, it tends to crack at grain boundaries. Therefore, other alloying elements were sought for strengthening. As indicated in Table 1, 10% Ta (IRHT-7) was added to the Ir base composition. Results show that Ta is a good strengthener but it also causes severe grain-boundary cracking. Thus, Ta was not selected as an alloying element for strengthening of Ir alloys.

Zr Effects

Figure 2:
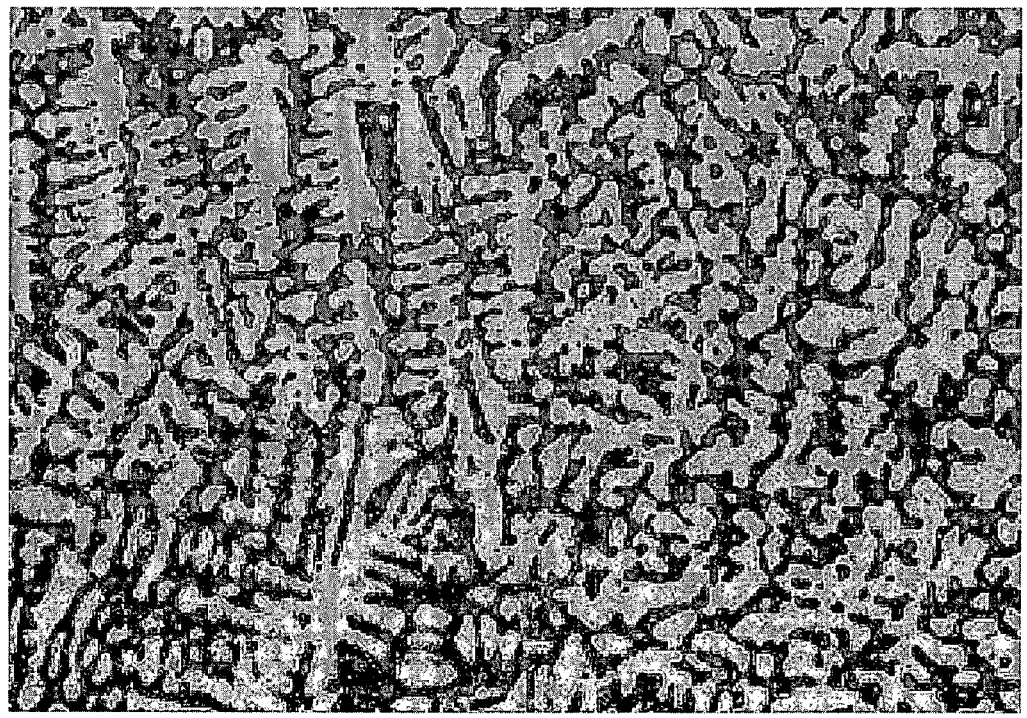
FIG. 2 is an optical micrograph showing microstructure of IRHT-9 alloy annealed for 1 h at 1500° C.

Zr was selected as an alloying addition to the Ir base composition. As shown in Table 1, IRHT-8 to IRHT-11 containing 0.7 to 5.0 at % Zr were prepared successfully by arc melting and drop casting. Zr is also an effective hardener, just like Nb and Ta additions. However, it was observed that Zr additions did not induce grain-boundary cracks in cast alloys. This is indicated in FIG. 2, which shows fine dendritic microstructures with no observable grain-boundary cracks. The dark regions are eutectic structures containing a mixture of Ir and $Ir_3Zr$ phases. These fine eutectic structures are expected to harden Ir-based alloys at ambient and elevated temperatures.

Hf Effects

Figure 3:
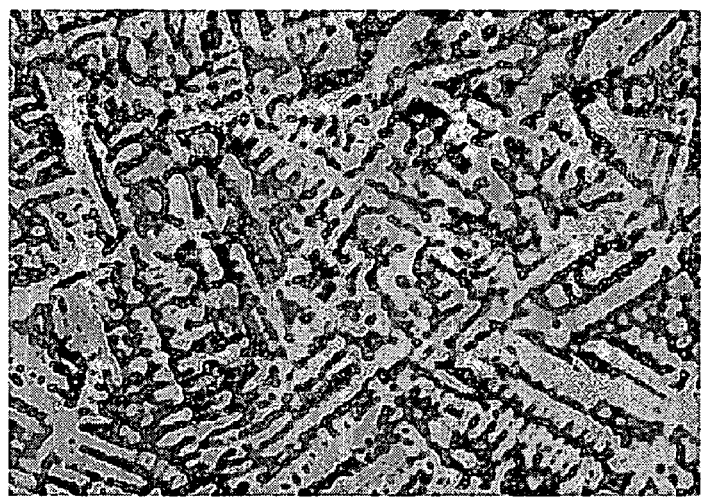
FIG. 3 is an optical micrograph showing microstructure of IRHT-12 alloy annealed for 1 h at 1500° C.
Figure 4:
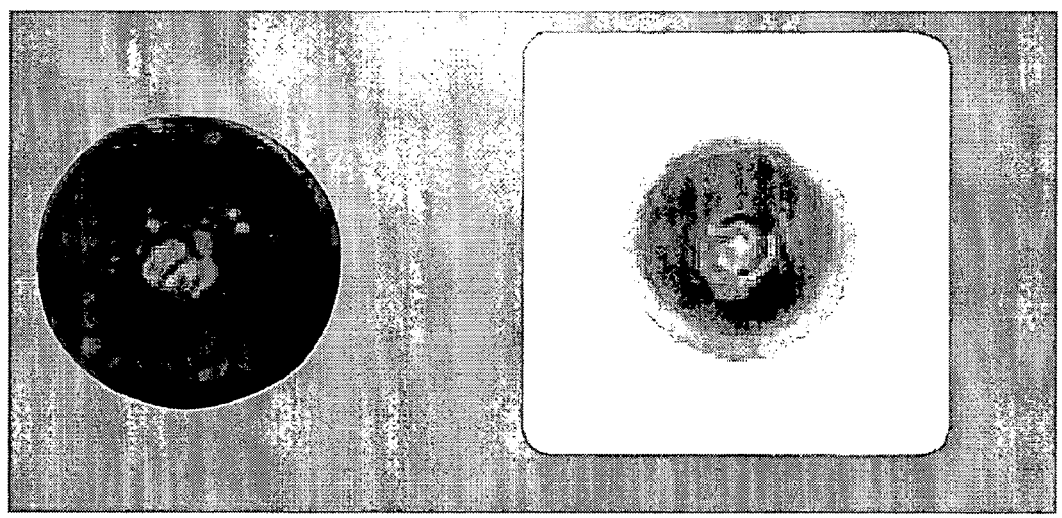
FIGS. 4a and 4b are photographs showing dimples made on ceramic leading rods during compression tests of IRHT alloys at temperatures above 1400° C.

Hf, chemically similar to Zr, was also added to the Ir base composition. FIG. 3 shows the optical micrograph of IRHT-12 containing 5% Hf. Comparison of FIGS. 2 and 3 indicates that Hf and Zr additions produce similar microstructures in the Ir base alloys. Both alloys IRHT-9 and IRHT-12 exhibited fine dendritic structures with eutectic structures in the dark regions. As indicated in Table 1, Hf is also an effective mercially available alloy, Haynes 25, are also summarized in Table 2 for comparison. Haynes 25 alloy has generally acceptable mechanical properties at room temperature; however, its yield strength drops to as low as 12.8 MPa at 1400° C. Haynes 25 alloy was not tested at temperatures above 1400° C. because of its low melting point. IRHT-9 with 4% Zr showed a yield strength of 657 MPa (95.4 ksi), an ultimate strength of 920 MPa (134 ksi) and a ductility of >22% at 1427° C. (1700 K). Comparison of IRHT-9 with IRHT-10 containing 4.5% Zr, shows that an increase of Zr by 0.5% significantly increases the strength of Ir based alloys. All IRHT alloys containing Zr and Hf additions are much stronger than commercial superalloys, such as Haynes 25, at 1427° C. In fact, IRHT alloys are stronger than structural ceramics, such as aluminum oxide, silicon carbide and silicon nitride. As shown in FIG. 4, dimples were made on the ceramic loading rods during compression tests of IRHT alloys at temperatures above 1400° C.

TABLE 2

| Test temperature (° C.) | Yield strength (MPa) | Ultimate strength (MPa) | Ductility (%) |
| --- | --- | --- | --- |
| Haynes 25 | | | |
| 20 | 714 | 2060 | 39 |
| 1400 | 12.8 | 16.2 | >20 |
| IRHT-9 | | | |
| 20 | 955 | 2860 | 31 |
| 1427 | 657 | 920 | >22 |

TABLE 2-continued

| Test temperature (° C.) | Yield strength (MPa) | Ultimate strength (MPa) | Ductility (%) |
|---|---|---|---|
| IRHT-10 | | | |
| 20 | 1111 | 3170 | 26 |
| 1427 | 726 | >1127 | >11 |
| IRHT-11 | | | |
| 20 | 1150 | 2640 | 26 |
| 1427 | >700 | >700 | — |
| IRHT-12 | | | |
| 20 | 1180 | 2390 | 27 |
| 1427 | 732 | — | — |

Figure 5:
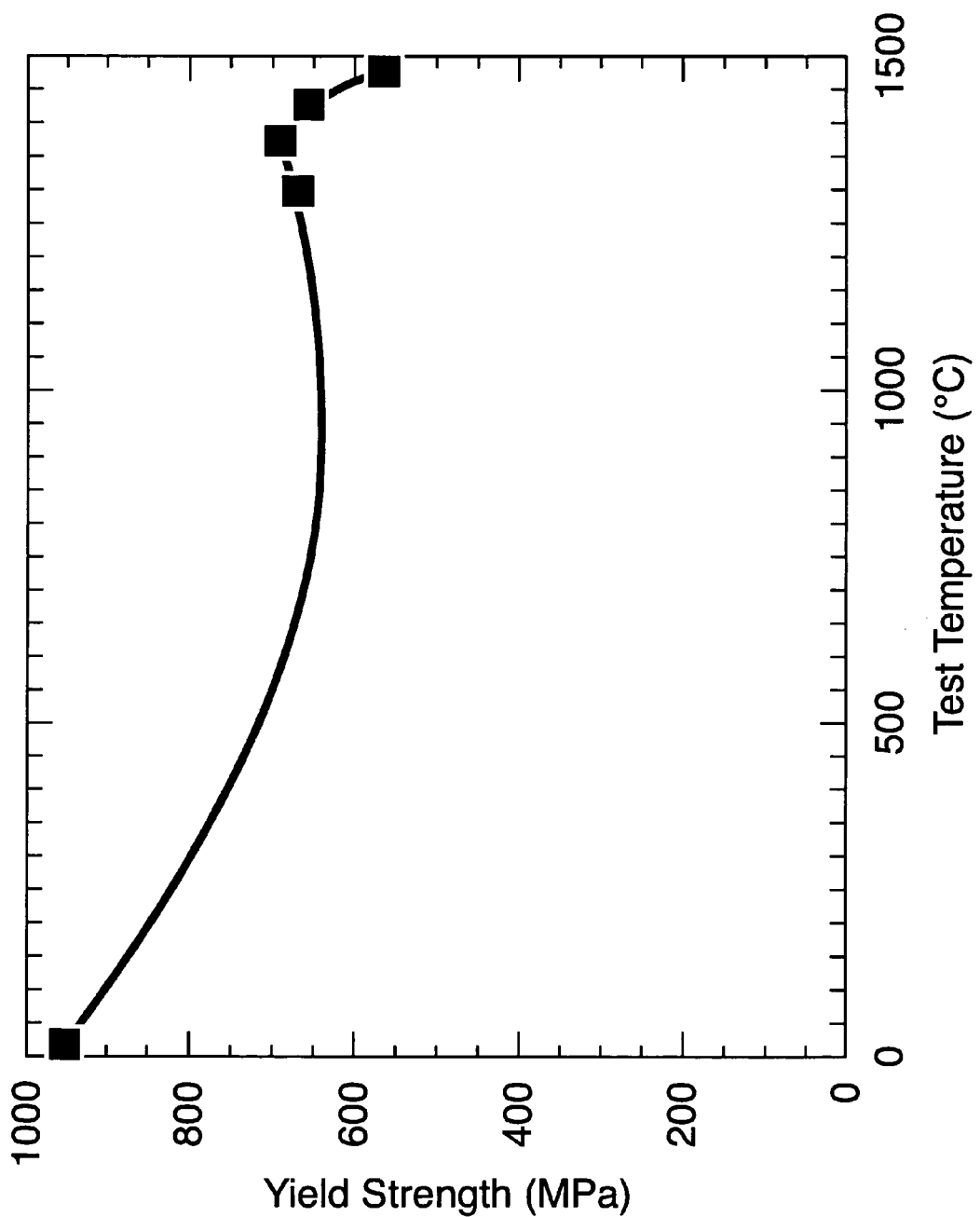
FIG. 5 is a plot of yield strength as a function of test temperature for IRHT-9 alloy.
Figure 6A:
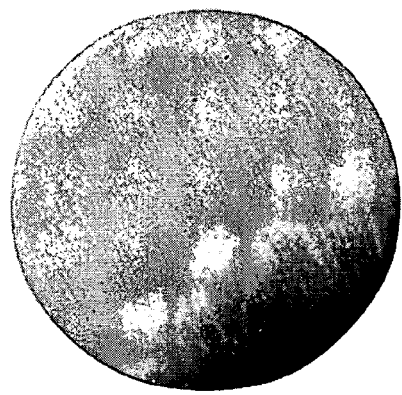
FIG. 6a. is a photograph of an unoxidized sample of commercially available Haynes 25 alloy.
Figure 6B:
FIG. 6b. is a photograph of a sample of commercially available Haynes 25 alloy after oxidation for 10 min at 1427° C. in air.
Figure 6C:
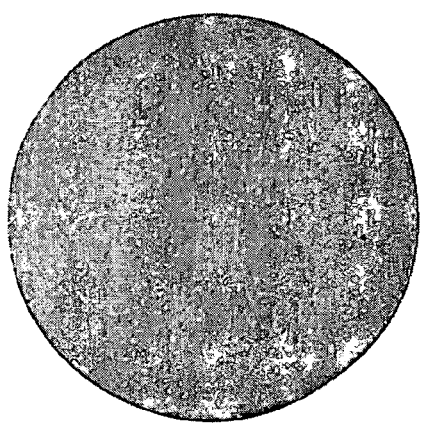
FIG. 6c. is a photograph of an unoxidized sample of IRHT-11 alloy.
Figure 6D:
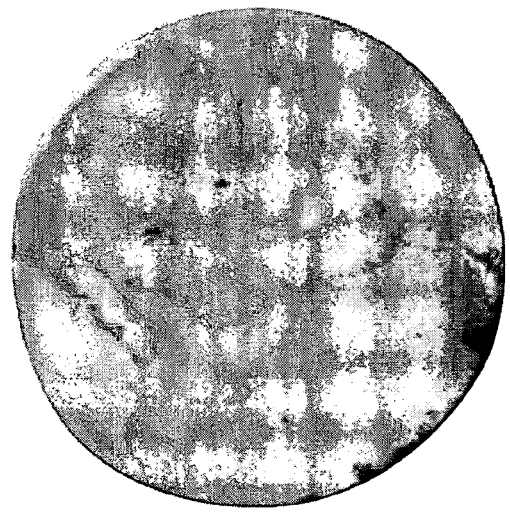
FIG. 6d. is a photograph of a sample of IRHT-11 alloy after oxidation for 10 min at 1427° C. in air.

The mechanical properties of IRHT-9 and IRHT-10 were determined by compression testing as a function of temperature. The test results are tabulated in Table 3 and plotted in FIG. 5. As shown in FIG. 5, the yield strength of IRHT-9 appears to be not sensitive to test temperature in the temperature range of 1300–1427° C. and it shows a moderate decrease above 1427° C. It is interesting to point out that the plot in FIG. 5 suggests a small increase in the yield strength with temperature at temperatures above 1000° C., and the strength reaches a maximum around 1400° C. The yield strength of IRHT-10 appears not to be sensitive to test temperature at and above 1370° C. Note that IRHT-10 containing 4.5% Zr is stronger than IRHT-9 containing 4% Zr by 30% at 1477° C. In terms of the yield strength, IRHT-9 and IRHT-10 both are distinctly stronger than Haynes 25 (by more than 5000%) at 1427° C.

TABLE 3

| Test temperature (° C.) | Yield strength (MPa) | Ultimate strength (MPa) | Ductility (%) |
|---|---|---|---|
| IRHT-9 | | | |
| 20 | 955 | 2860 | 31 |
| 1300 | 673 | >1000 | >12 |
| 1377 | 693 | >900 | >10 |
| 1427 | 657 | >920 | >22 |
| 1477 | 570 | 935 | 25 |
| IRHT-10 | | | |
| 20 | 1111 | 3170 | 26 |
| 1370 | 756 | >1121 | >26 |
| 1427 | 726 | >1127 | >11 |
| 1477 | 739 | 1117 | 30 |

Oxidation Resistance

Oxidation study of IRHT alloys was carried out at 1427° C. for 10 min in air. Table 4 summarizes the weight change of IRHT alloys together with that of commercial Haynes 25. For all IRHT alloys, a thin layer of oxide was formed, resulting in small weight changes. For Haynes 25 alloy, thick oxide layers were formed, which cracked and spalled during cooling from 1427° C. The net weight change of the Haynes 25 alloy sample was the result of a balance between the weight gain from oxide scale formation and the severe spalling of the oxide layer. FIG. 6 compares the oxidation behavior of IRHT-11 sample with Haynes 25 alloy sample after the oxidation exposure. A severe distortion of the Haynes 25 surfaces is observed whereas a very thin layer of oxides is observed on IRHT-11 sample. Thus, the oxidation resistance of IRHT alloys distinctly superior to that of Haynes 25.

TABLE 4

| Alloy number | Weight Change (mg/cm$^2$) |
|---|---|
| IRHT-1 | +0.12 |
| IRHT-2 | −0.04 |
| IRHT-8 | −0.27 |
| IRHT-9 | −0.25 |
| IRHT-11 | −1.12 |
| IRHT-12 | −0.42 |
| Haynes 25 | −12.45 |

Thermal Shock Resistance

The thermal shock resistance of IRHT alloys was characterized using a cylindrical IRHT-10 specimen having a diameter of 0.24 mm. The specimen was first held at 1427° C. for 10 min and then quenched directly into stirred water. Optical examination showed no indication of oxide coatings or microcracks on specimen surfaces. IRHT-10 alloy is thus quite resistant to thermal shock. The mechanical properties of this oxidized and quenched specimen were evaluated by compression testing at 1427° C. The alloy specimen exhibited a yield strength of 720 MPa and an ultimate strength of >1110 MPa at 1427° C., the values of which are comparable to those of IRHT-10 specimen without these treatments. It is thus concluded that the 1427° C. pre-oxidation and thermal shock treatment have no adverse effects on the mechanical properties of IRHT-10.

Figure 7:
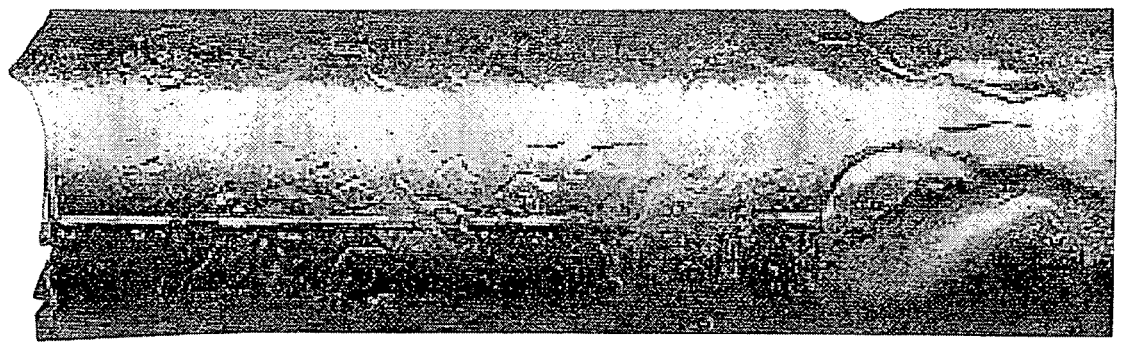
FIG. 7 is a photograph of 0.5"-diameter ingot of IRHT-10 alloy quenched directly into water after air oxidation for 10 min at 1427° C.

Thermal stresses are expected to increase with specimen size. To further characterize the thermal shock resistance, an alloy ingot of IRHT-10 with the dimension of 0.5" dia.x1.6" length was first air oxidized for 10 min at 1427° C. and then quenched directly into water. FIG. 7 shows the oxidized and quenched ingot. Optical examination reveals no apparent oxide scales or microcracks formed on the ingot surface. Based on all these results, it can be concluded that the thermal shock resistance of IRHT-10 is very desirable for structural use at high temperatures.

Ir-based high-temperature alloys in accordance with the present invention have mechanical and metallurgical properties are superior to most, if not all previously known metallic alloys at temperatures above 1200° C.

Because of excellent mechanical and metallurgical properties at high temperatures, Ir-based alloys of the present invention can be used as structural and functional components, especially those exposed to hostile environments at elevated temperatures such as used in advanced heat engines and energy conversion systems as well as other industrial systems.

Some specific applications for alloys of the present invention include for example, but are not limited to: nozzle materials for hypersonic wind tunnel systems; tool materials for stirring frictional welding rigs; and spark plug materials for various advanced engine systems. For these applications, the alloys are required to have high strength, erosion resistance, and corrosion resistance at temperatures above 1200° C.

The Ir alloys of the present invention can be used as coatings on various other materials, for example, metals, alloys, cermets, and ceramics. The Ir alloys can be applied by plasma spray, high-intensity infrared fusion, etc. For application on materials with mismatched thermal characteristics and/or crystal lattices, buffer materials can be used, and/or graded structures can be used. The coating of other materials with IRHT alloys significantly improves the oxidation and erosion resistance of articles.

Such uses can lower the overall cost of component fabrication because less expensive materials can be used as substrates, with the Ir alloys of the present invention as coatings (including layers, laminates, etc.) thereon to gain the benefit thereof at the point of exposure to oxidizers, corrosives, high wear, etc. at high temperatures.

In view of the high cost of Ir metal, these new alloys are preferentially used as critical parts in industrial systems where good strength and resistance to oxidation, corrosion, and erosion are required at elevated temperatures.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. An alloy composition consisting essentially of, in atomic percent: about 0.3 to about 1% W, about 0.31 to about 0.8% C, about 0.06 to about 0.8% B, about 0.005 to about 0.02% Th, and about 1 to about 10% of at least one element selected from the group consisting of Zr and Hf, balance Ir.

2. An alloy in accordance with any one of claim 1, inclusive, wherein said alloy composition is formed into an article.

3. An alloy in accordance with claim 2 wherein said article comprises a component of a system selected from the group consisting of: a hypersonic wind tunnel system; a stirring frictional welding rig; and an engine system.

4. An article comprising a substrate having thereon an alloy coating consisting essentially of, in atomic percent, about 0.3 to about 1% W, about 0.31 to about 0.8% C, about 0.06 to about 0.8% B, about 0.005 to about 0.02% Th, and about 1 to about 10% of at least one element selected from the group consisting of Zr and Hf, balance Ir.

5. An article in accordance with claim 4 wherein said article is formed into a component of a system selected from the group consisting of: a hypersonic wind tunnel system; a stirring frictional welding rig; and an engine system.

* * * * *